(12) United States Patent
Akagi et al.

(10) Patent No.: US 8,976,484 B1
(45) Date of Patent: Mar. 10, 2015

(54) MAGNETIC RECORDING WITH TILTED MEDIA IN THE CROSS TRACK DIRECTION

(71) Applicant: HGST Netherlands B.V., Amsterdam (NL)

(72) Inventors: Kyo Akagi, Fucyu (JP); Takayuki Ichihara, Setagaya-Ku (JP); Masafumi Mochizuki, Chigasaki (JP); Hiroyasu Tanabe, Kounan-Ku (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/062,155

(22) Filed: Oct. 24, 2013

(51) Int. Cl.
*G11B 21/02* (2006.01)
*G11B 5/09* (2006.01)
*G11B 5/11* (2006.01)

(52) U.S. Cl.
CPC ... *G11B 5/09* (2013.01); *G11B 5/11* (2013.01)
USPC ............................................. 360/97.01

(58) Field of Classification Search
USPC ....................................... 360/97.01
See application file for complete search history.

(56) References Cited

U.S. PATENT DOCUMENTS

| 7,405,011 | B2 |   | 7/2008 | Stipe et al. |         |
|-----------|----|---|--------|-------------|---------|
| 8,059,351 | B2 |   | 11/2011| Mutoh       |         |
| 8,189,294 | B2 |   | 5/2012 | Edelman et al. |      |
| 8,257,845 | B2 |   | 9/2012 | Hinoue et al. |       |
| 8,264,916 | B1 |   | 9/2012 | Aoyama et al. |       |
| 8,300,341 | B2 |   | 10/2012| Itakura et al. |      |
| 8,638,514 | B2 | * | 1/2014 | Sato et al. | 360/48  |
| 8,643,970 | B2 | * | 2/2014 | Tagami et al. | 360/55 |
| 8,665,545 | B2 | * | 3/2014 | Coker et al. | 360/53 |
| 8,724,248 | B2 | * | 5/2014 | Dhanda et al. | 360/75 |
| 8,786,969 | B2 | * | 7/2014 | Kasiraj et al. | 360/39 |
| 8,797,672 | B2 | * | 8/2014 | Tanabe et al. | 360/75 |
| 2012/0236431 | A1 |   | 9/2012 | Hirata et al. |      |
| 2012/0314324 | A1 |   | 12/2012| Guan          |      |
| 2013/0028058 | A1 |   | 1/2013 | Yasui et al.  |      |
| 2013/0057978 | A1 |   | 3/2013 | Sakai et al.  |      |

* cited by examiner

*Primary Examiner* — Mark Blouin
(74) *Attorney, Agent, or Firm* — Patterson & Sheridan, LLP

(57) ABSTRACT

The embodiments of the present invention relate to a shingled magnetic recording system having a magnetic recording medium that has a magnetization easy axis in the recording layer of the medium that is oriented in from the bottom surface to the top surface of the recording layer. Additionally, a magnetization easy axis in the recording layer of the medium is inclined with respect to the recording track width direction.

20 Claims, 8 Drawing Sheets

MAGNETIC RECORDING WITH TILTED MEDIA IN THE CROSS TRACK DIRECTION

BACKGROUND

1. Field

Embodiments of the present invention generally relate to a magnetic recording system, and a magnetic recording device fitted with a magnetic head and a magnetic recording medium, employing said magnetic recording system.

2. Description of the Related Art

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider towards the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing, the write and read heads are employed for writing magnetic impressions to and reading magnetic signal fields from the rotating disk. The read and write heads are connected to processing circuitry that operates according to a computer program to implement the writing and reading functions.

Through the years, the amount of data that can be stored (i.e., the recording density) on the magnetic disk drive has increased. The bit direction and track width direction of recorded magnetized information are both reduced in order to increase the recording density in a magnetic disk device. To this end, the cluster size of the recording medium has to be refined and the recording head field has to be made steeper. The more refined the cluster size becomes, the greater the deterioration in the value of (KuV/k T), which is an indicator of thermal stability in the reversal region, where Ku is the magnetic anisotropy constant, V is the magnetization minimum unit volume, k is the Boltzmann constant, and T is the absolute temperature. It is necessary to increase the anisotropy magnetic field Hk as a means for solving this problem. The higher the value of Hk, the greater the field intensity has to be. In the case of high-density recording, the recording track width also has to be reduced, which leads to a subsequent problem in that the recording field is inadequate.

A method for alleviating this problem has been proposed in which the recording medium is locally heated only during recording in order to reduce the effective coercive force Hc. This method is widely called heat-assisted recording, and a method in which heating is provided by light in particular is referred to as heat-assisted magnetic recording (HAMR). Microwave-assisted magnetic recording (MAMR), in which the switching field of a medium is reduced using microwaves, has also been proposed.

Furthermore, shingled magnetic recording (SMR) which involves overwriting one side of a recording track has also previously been proposed. In SMR, recording tracks which are recorded on the magnetic recording medium by means of a magnetic head are recorded in a partially overlapping manner. SMR involves recording in such a way that recording tracks are overlapping, as shown in FIG. 1A-1C. A track Tw1 is first of all recorded (See FIG. 1A), and a track Tw2 is then recorded in such a way as to partially overlap the track Tw1 (See FIG. 1B). A track Tw3 is recorded in the same way (See FIG. 1C). It is possible to realize a magnetic recording device having a track pitch which is smaller than the recording tracks to be recorded. It is also feasible to use an arrangement in which the magnetic pole width of the recording head is greater than that of a conventional perpendicular magnetic recording device. Furthermore, one side is overwritten, and therefore there are fewer constraints as to the shape of the magnetic pole over the width thereof, and it is possible to increase the field intensity and gradient.

However, the requirement of increased recording volume has not kept up with the current increase in data volume. It is therefore necessary to increase the recording density in SMR. To this end, it is necessary to provide a field distribution which is suitable for SMR.

Therefore, there is a need in the art for a magnetic recording system for SMR which makes it possible to produce a large field intensity and field gradient, and a field distribution which is suited to higher density.

SUMMARY OF THE INVENTION

The embodiments of the present invention relate to a shingled magnetic recording system having a magnetic recording medium that has a magnetization easy axis in the recording layer of the medium that is oriented in from the bottom surface to the top surface of the recording layer. Additionally, a magnetization easy axis in the recording layer of the medium is inclined with respect to the recording track width direction.

In one embodiment, a shingled magnetic recording system, comprises a magnetic recording medium and a magnetic head. The magnetic recording medium includes a recording layer having a top surface and a bottom surface. A magnetization easy axis of the recording layer is oriented in a direction from the bottom surface to the top surface of the layer. Additionally, a magnetization easy axis in the recording layer of the medium is inclined with respect to a recording track direction. The magnetic head includes a read head having a sensing element disposed between magnetoresistive shields, and a write head.

In the magnetic recording system discussed herein, information bits are recorded or written onto a magnetic recording medium using a magnetic head. The information is recorded with overlapping recording tracks, wherein use is made of the medium in which the magnetization easy direction of the recording layer is oriented in the direction from the rear surface of the recording layer toward the front surface, and the medium is inclined with respect to the recording track width direction (medium radial direction). In one embodiment, the track movement direction and the direction of inclination in the track width direction of the magnetization easy direction of the recording layer are opposite when recording tracks are overwritten. In another embodiment, the angle of inclination in the track width direction of the magnetization easy direction of the recording layer is between 20 and 45°. In another embodiment, the magnetic head has an asymmetrical shape with respect to the track width direction. In another embodiment, the magnetic head is provided with a side shield only on the opposite side to the direction of overwriting of recording tracks. In another embodiment, the magnetic head is such that the main pole and a side shield gap, known as a side gap, on the side of the direction of overwriting of recording track are larger than a side gap on the opposite side.

In another embodiment, a magnetic recording device which is provided with: a magnetic recording medium comprising at least a recording layer, a magnetic head, a slider on which the magnetic head is mounted, a suspension arm for fixing the slider, and an actuator for supporting the suspension arm, in which the magnetic head is moved to any position on the magnetic recording medium by operation of the actuator in order to record information, the magnetic recording device employing the recording system discussed above.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1A:
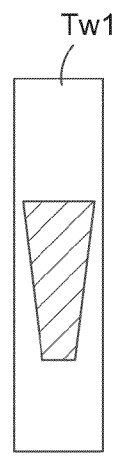
FIGS. 1A-1C are schematic illustrations of track overwriting in SMR.
Figure 1B:
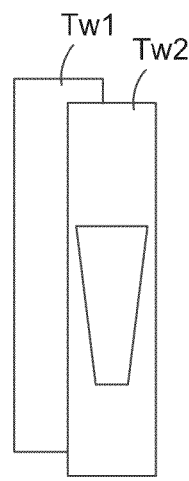
Figure 1C:
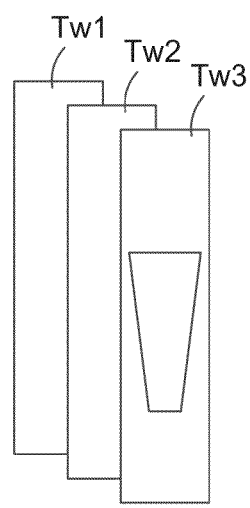
Figure 2A:
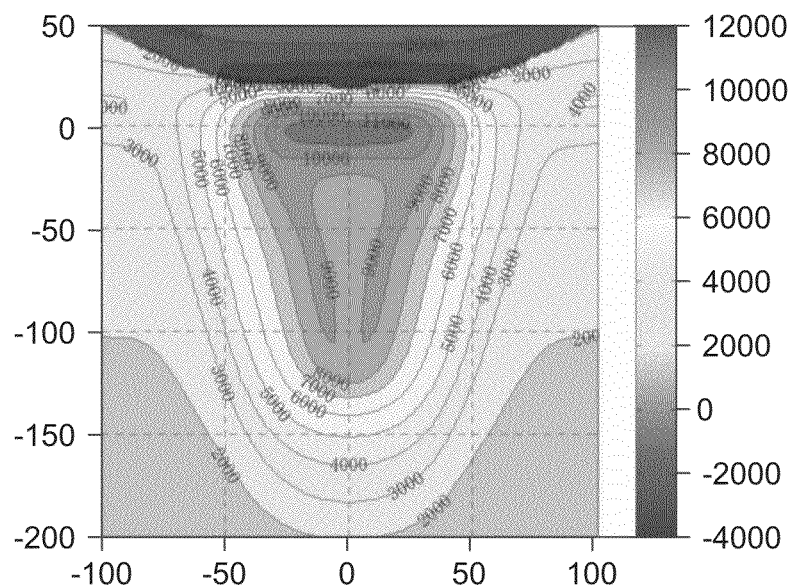
FIG. 2A is a schematic illustration of the recording field distribution in a conventional system.
Figure 2B:
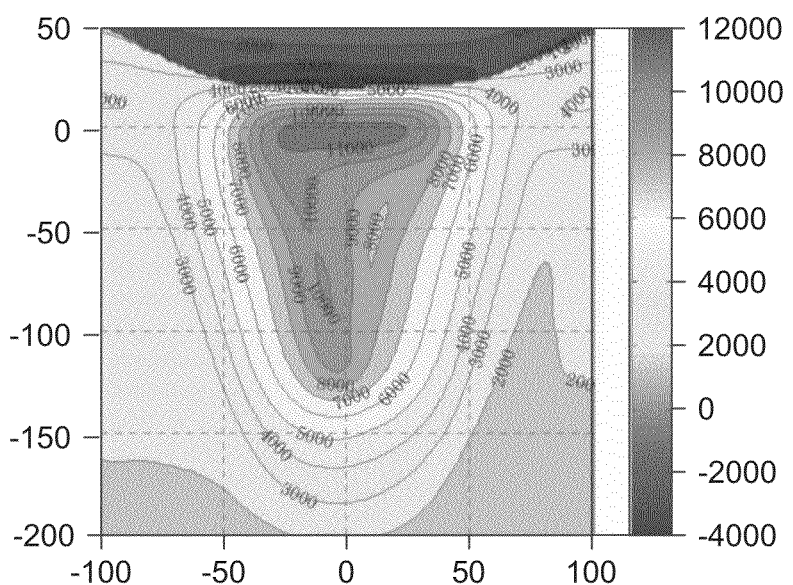
FIG. 2B is a schematic illustration of the recording field distribution in a system according to one embodiment.

The present invention involves the use of a recording medium for SMR in which one side of a recording track is overwritten, wherein the magnetization easy axis direction of the medium is oriented in the track width direction. The embodiments discussed herein render it possible to increase the field intensity on one side in the track width direction, as shown in FIG. 2B as compared to the field distribution for conventional systems shown in FIG. 2A, and also to achieve a field distribution with a magnetic field bevel, and higher density.

Figure 3:
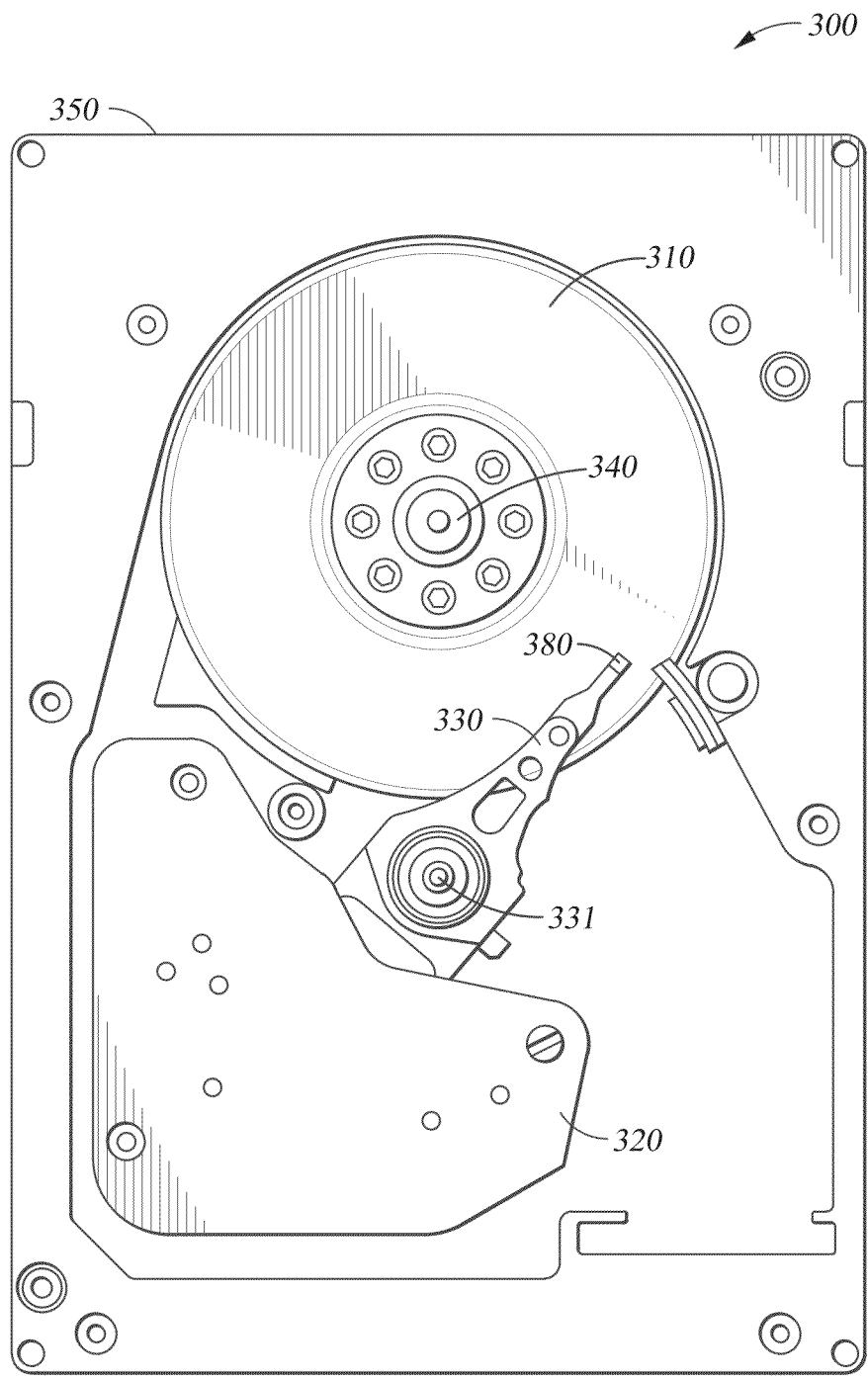
FIG. 3 illustrates an exemplary magnetic recording system, according to an embodiment of the invention.

FIG. 3 illustrates a top view of an exemplary magnetic recording system 300, according to an embodiment of the invention. As illustrated, magnetic recording system 300 may include one or more magnetic recording mediums 310, actuator 320, actuator arms 330 associated with each of the magnetic recording mediums 310, and spindle motor 340 affixed in a chassis 350. The one or more magnetic recording mediums 310 may be arranged vertically as illustrated in FIG. 3. Moreover, the one or more magnetic recording mediums may be coupled with the spindle motor 340.

Magnetic recording mediums 310 may include circular tracks of data on both the top and bottom surfaces of the medium. A magnetic head 380 mounted on a slider may be positioned on a track. As each medium spins, data may be written on and/or read from the data track. Magnetic head 380 may be coupled to an actuator arm 330 as illustrated in FIG. 3. Actuator arm 330 may be configured to swivel around actuator axis 331 to place magnetic head 380 on a particular data track.

Figure 4:
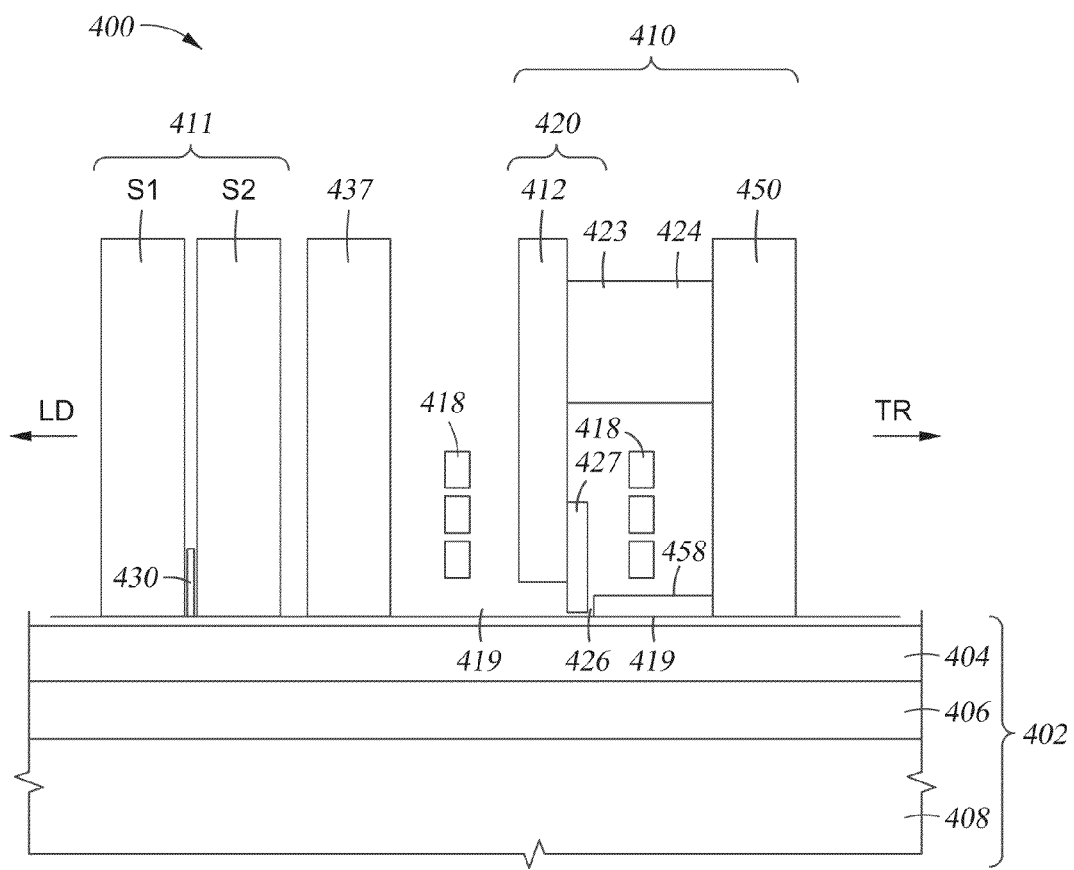
FIG. 4 is a side view of a read/write head and magnetic recording medium of the magnetic recording system of FIG. 3, according to one embodiment of the invention.

FIG. 4 is a fragmented, cross-sectional side view through the center of a read/write head 400 mounted on a slider and facing magnetic recording medium 402. In write head 410, a pillar 423 composed of a magnetic body and an insulating body 424 may be arranged between a main magnetic pole 420 and an auxiliary magnetic pole 450. The main magnetic pole 420, the auxiliary magnetic pole 450, and the pillar 423 may be composed of a soft magnetic material such as permalloy, CoFe alloy, etc. Preferably, the insulating body 424 is thinned so that the main magnetic pole 420, the auxiliary magnetic pole 450, and the pillar 423 are coupled magnetically. There is almost no deterioration in the magnetic field strength applied to the recording medium even if the insulating body 424 is approximately 1 μm. A pole section 427 is provided in the main magnetic pole 420 to be in contact with a yoke 412. The pole section 427 extends to the head air bearing surface 419, and the end surface 426 of the pole section is exposed to the head air bearing surface 419. A magnetic body 458 for creating a steep magnetic field gradient is provided on the trailing side of the pole section 427. The magnetic body 458 may be provided on only the trailing side of the pole section 427, or surround the pole section 427 on three sides of the trailing side of the pole section 427 and on both sides in the track width direction. A read head 411 includes a sensor element 430 composed of a magnetoresistance effect element and a pair of magnetic shields S1, S2 which sandwich the element. In addition, a shield 437 composed of a magnetic body is arranged with the objective of reducing the flowing of the recording magnetic field into the magnetic shield S2.

The main magnetic pole 420 is magnetized by a coil 418 wrapped around a magnetic circuit which includes the main magnetic pole 420 and the auxiliary magnetic pole 450, in the example in the drawing, by the coil 418 which encloses and wraps around the yoke 412, and generates the recording magnetic field from the end surface 426 of the pole section 427. The recording magnetic field generated from the pole section 427 vertically penetrates a magnetic recording layer 404 and an intermediate layer 406 of the magnetic disk 402, is returned by the soft magnetic backing layer 408, and is absorbed by the auxiliary magnetic pole 450. The recording magnetic field generated by the pole section 427 is applied to the magnetic recording layer 404.

Figure 5:
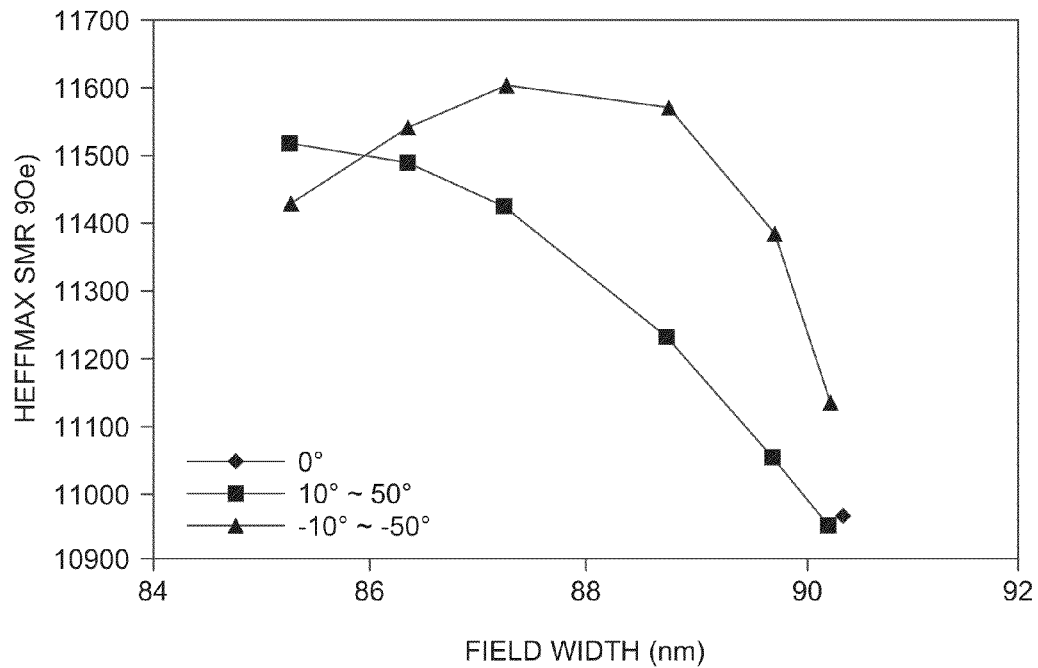
FIG. 5 is a graph showing the effect of increasing the field intensity by changing the magnetic field incline.
Figure 6:
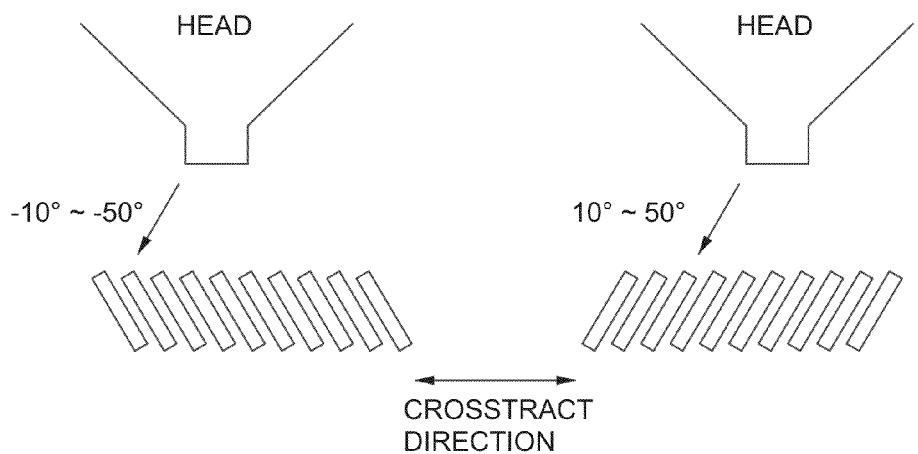
FIG. 6 is a schematic illustration of the magnetic field incline.

The graph in FIG. 5 shows the relationship between the field width and field intensity when the angle of inclination of the magnetization easy axis is varied +/−50°. The horizontal axis shows the field width at 7500 Oe, while the vertical axis shows the field intensity at the SMR track center with an assumed track pitch of 38 nm. 0 deg indicates a conventional configuration, while the others are configurations according to the present embodiments. The case indicated by the line having squares relates to an inclination of the medium magnetization easy axis as shown in the schematic diagram at the bottom on the left-hand side of FIG. 6. Furthermore, the case shown by the line having triangles relates to an inclination of the medium magnetization easy axis as shown in the schematic diagram at the bottom on the right-hand side of FIG. 6. In both cases, the configuration of the present invention produces a greater field intensity with a narrower field width compared with a conventional configuration. An increase in the intensity of the order of 5% can be achieved. The configuration shown in the schematic diagram on the left-hand side in FIG. 6 is preferred in order to achieve a greater effect.

Figure 7:
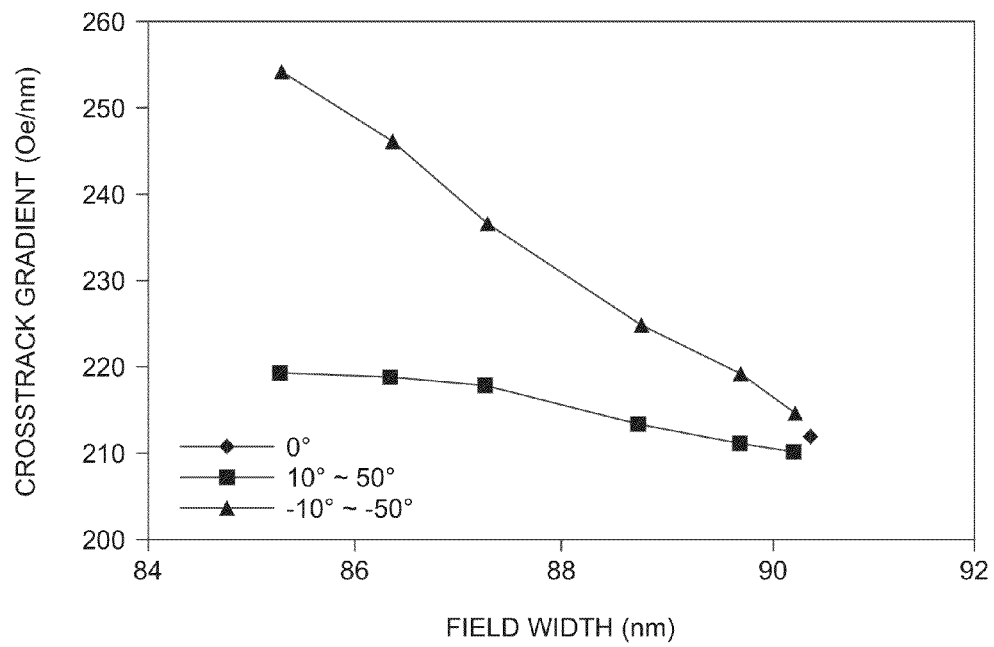
FIG. 7 is a graph illustration the effect of increasing the field gradient according to another embodiment.

FIG. 7 shows the relationship between the field width and the field gradient in the track width direction when the angle of inclination of the magnetization easy axis is varied by +/−50°. The horizontal axis shows the field width at 7500 Oe, while the vertical axis shows the field gradient in the track width direction at 7500 Oe. 0 deg indicates a conventional configuration, while the others are configurations according to the present invention. The case indicated by the line with square markers relates to an inclination of the medium magnetization easy axis as shown in the schematic diagram at the bottom on the left-hand side of FIG. 6. Furthermore, the case shown by the line with triangle markers relates to an inclination of the medium magnetization easy axis as shown in the schematic diagram at the bottom on the right-hand side of FIG. 6. In both cases, the configuration of the present invention produces a greater field intensity with a narrower field width compared with a conventional configuration. The configuration shown in the schematic diagram on the left-hand side in FIG. 6 is preferred in order to achieve a greater effect.

It should be noted that tracks subjected to shingled recorded using the effect shown in FIGS. 5 and 7 above can be effectively written from either side, but there is a greater variation in field gradient and intensity when the magnetization easy axis and field angle relationship is in a direction that affords easy writing, and this is therefore more effective.

Figure 8A:
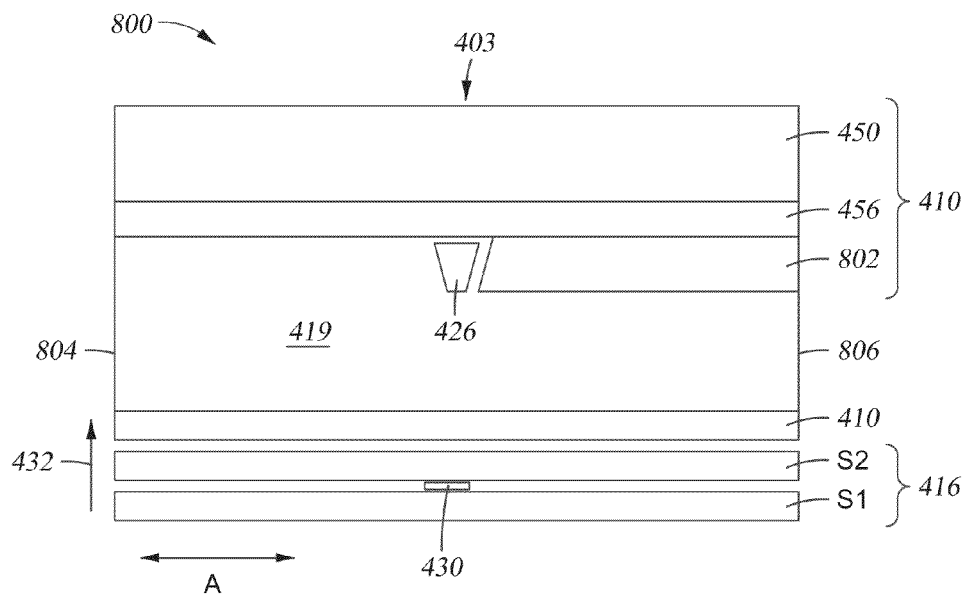
FIGS. 8A and 8B are schematic illustrations of a magnetic head viewed from the ABS and a cross-sectional view respectively, according to one embodiment.
Figure 8B:
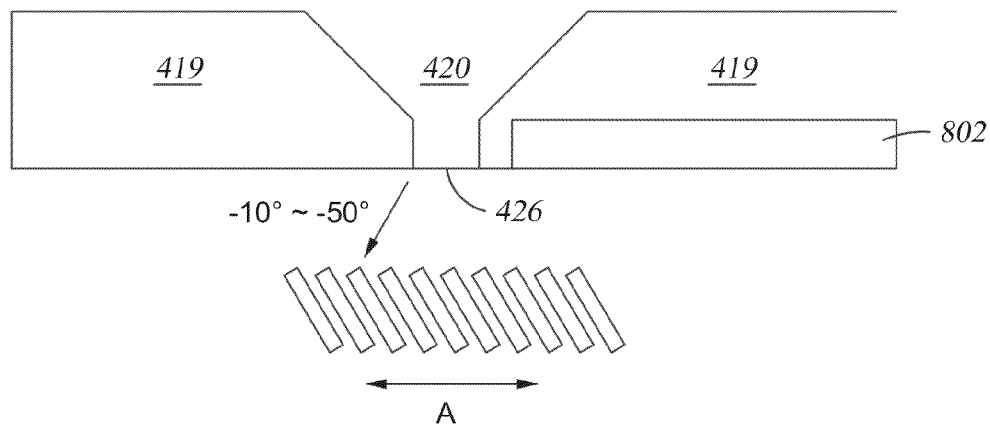

FIGS. 8A and 8B are schematic illustrations of a magnetic head viewed from the ABS and a cross-sectional view respectively, according to one embodiment. As shown in FIG. 8A, the magnetic head 800 includes a write head 410 and the read head 411. The write pole 420 is surrounded by the non-magnetic material 419. As clearly shown in both FIGS. 8A and 8B, only one side shield 802 is disposed adjacent the write pole 420 at the ABS and extending in the cross track direction shown by arrow "A". The shield 802 may comprise magnetic material having a high saturation magnetic flux density, such as nickel iron alloy, ferroalloy or the like. The end 426 of the write pole 420 at the ABS is surrounded by the non-magnetic material 419. Because the shield 802 is disposed adjacent only one side of the write pole 420, when viewed from the ABS, the magnetic field intensity increases on the side without the shield. In other words, the asymmetric structure of the magnetic head causes an increase in the field intensity on one side of the head. In one embodiment, the shield 802 may be spaced from the write pole 420 by a distance, referred to as the side gap, of between about 10 nm to about 50 nm, and the incline the magnetic field is between about 10 degrees and about 50 degrees.

The non-magnetic material 419 surrounding the write pole 420 and extends to a first edge 804 of the write head 410 in a cross track direction when viewed from an air bearing surface. The shield 802 is disposed adjacent the non-magnetic material 419 and extends, when viewed from the air bearing surface, to a second edge 806 of the write head 420 in the cross track direction that is opposite the first edge 804.

As shown in FIG. 8B, the write pole 420 has a throat portion 808 that extends a distance from the ABS and then the write pole 420 flares out in the cross-track direction. In the embodiment shown in FIG. 8B, the throat has a uniform throat height (i.e., the distance from the ABS to the flare point) and is surrounded by non-magnetic material 419.

Furthermore, the head 800 can be stated to have an asymmetrical structure in the track width direction such that the field intensity increases on one side. As shown in FIG. 8A, the side shield 802 is provided on only one side, and as a result the field intensity is increased on the opposite side in the cross-track direction. In addition, a greater effect can be achieved when the head 800 and the medium easy axis are inclined. As shown in FIG. 8B, the easy axis is inclined so that recording is facilitated on the side without the side shield.

Figure 9:
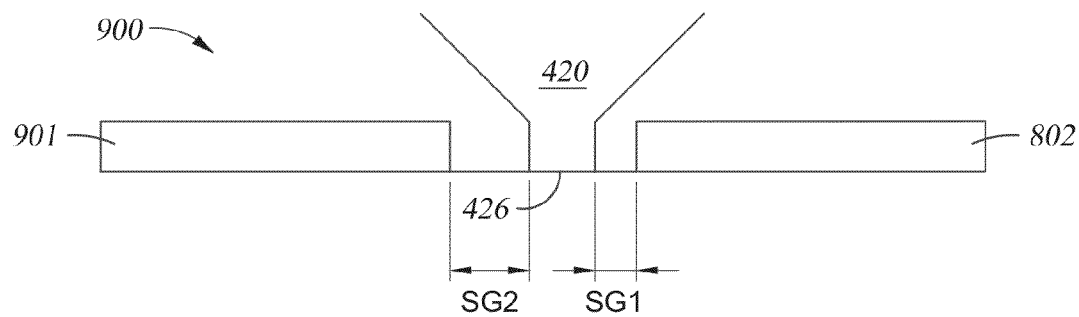
FIG. 9 is a schematic cross-sectional illustration of a magnetic head according to another embodiment.

FIG. 9 is a schematic cross-sectional illustration of a magnetic head 900 according to another embodiment. In FIG. 9, the write pole 420 again has a throat portion having a uniform throat height from the ABS to the flare point, but a second side shield 901 is present. The field intensity can be enhanced by making the main pole and the side shield asymmetric, as shown in FIG. 9. The first side shield 802 is spaced a first distance SG1 from the write pole 420 while the second side shield 901 is spaced a second distance SG2 from the write pole 420. Thus, the shields 802, 901 are asymmetrically spaced from the write pole 420. In one embodiment, the first shield 802 is spaced between about 10 nm and about 50 nm from the write pole 420 and the second side shield spaced between about 20 nm to about 75 nm from the write pole 420. The easy axis is inclined so that recording is facilitated on the side having the second side shield 901.

Figure 10:
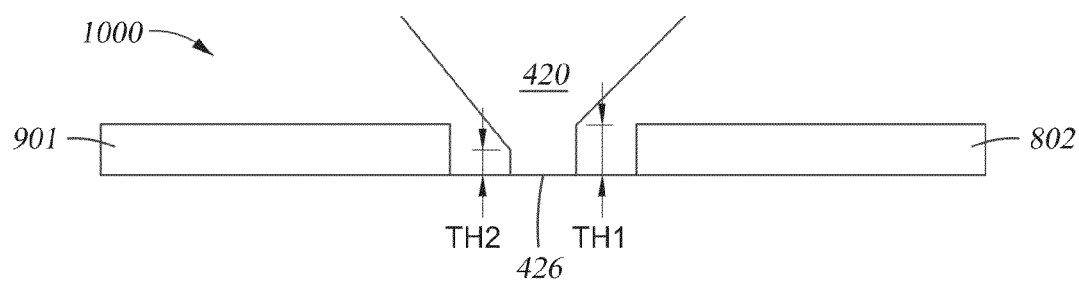
FIG. 10 is a schematic cross-sectional illustration of a magnetic head according to another embodiment.

FIG. 10 is a schematic cross-sectional illustration of a magnetic head 1000 according to another embodiment. The field intensity can be enhanced by making the write pole 420 shape asymmetric to the left and right in the track width direction, as shown in FIG. 10. In FIG. 10, the first and second side shields 802, 901 are spaced a substantially equal distance from the write pole 420. However, the throat height is not uniform. As shown in FIG. 10, the throat height TH1 adjacent the first side shield 802 is greater than the throat height TH2 adjacent the second side shield 901. In one embodiment, TH1 may be between about 20 nm and about 75 nm and TH2 may be between about 10 nm and about 50 nm. The easy axis is inclined so that recording is facilitated on the side having the shorter throat height TH2.

While not shown, it is contemplated that the various embodiments may be combined where possible. For example, it is contemplated that only one side shield 802 may be present, and the throat height may be asymmetric. Additionally, it is contemplated that both the spacing between the write pole 420 and the side shields 802, 901 and the throat height may be asymmetric.

In the magnetic recording system according to the embodiments discussed herein, the magnetization easy axis of the magnetic recording medium is inclined in the track width direction. By virtue of this configuration, it is possible to achieve a field distribution such as that shown in FIG. 2B from the field distribution in a conventional system shown in FIG. 2A when the magnetization easy axis is inclined by 10° in the track width direction from a direction perpendicular to the surface of the medium. The field distribution in FIG. 2B is suitable for SMR because the field distribution is biased towards one side in the track width direction.

Moreover, the recording field is expressed by a combination of a perpendicular component and an in-plane component which takes account of the magnetization easy axis and recording field angle, in accordance with Stoner-Wohlfarth theory.

Figure 11A:
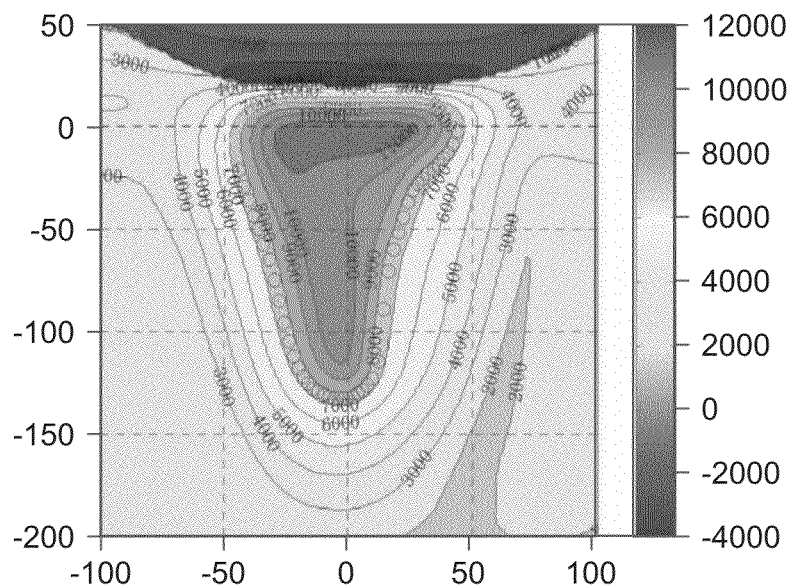
FIGS. 11A and 11B are schematic illustrations of recording field distributions according to various embodiments.
Figure 11B:
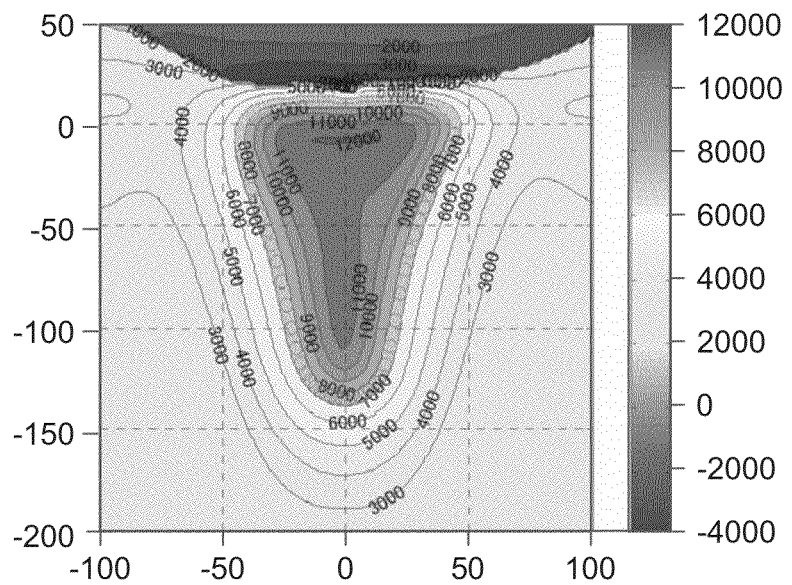

Furthermore, FIGS. 11A and 11B are field distribution diagrams for when the angle of inclination of the magnetization easy axis is varied. FIG. 11A shows an inclination of 20° and FIG. 11B shows an inclination of 40°. It is clear that the field distribution is biased on one side and there are more locations where the recording field intensity is greater. In addition, the configuration of the present invention makes it possible to achieve recording performance with a beveled field distribution.

It should be noted that the present invention may also be used for shingled recording in assisted recording such as 2-dimensional magnetic recording, HAMR, and MAMR. A mode of embodiment of the present invention has been described above, but the present invention is not limited to the abovementioned mode of embodiment and a person skilled in the art will be able to implement various modifications.

By tilting the magnetic field in the cross-track direction, SMR may occur. The tilted magnetic field makes it possible to produce a large field intensity and field gradient, and a field distribution which is suited to higher density utilized in SMR.

While the foregoing is directed to embodiments of the present invention, other and further embodiments of the invention may be devised without departing from the basic scope thereof, and the scope thereof is determined by the claims that follow.

What is claimed is:

1. A shingled magnetic recording system, comprising:
   a magnetic recording medium that includes a recording layer having a top surface and a bottom surface wherein a magnetization easy axis of the recording layer is oriented in a direction from the bottom surface to the top surface, and wherein the magnetization easy axis of the recording layer is inclined with respect to a recording track width direction; and
   a magnetic head including:
      a read head having a sensing element disposed between magnetoresistive shields; and
      a write head.

2. A shingled magnetic recording system, comprising:
   a magnetic recording medium that includes a recording layer having a top surface and a bottom surface wherein a magnetization easy axis of the recording layer is oriented in a direction from the bottom surface to the top surface, and wherein the magnetization easy axis of the recording layer is inclined with respect to a recording track width direction; and
   a magnetic head including:
      a read head having a sensing element disposed between magnetoresistive shields; and
      a write head;
   wherein a track movement direction and the inclination in the recording track width direction are opposite during track overwriting.

3. The shingled magnetic recording system of claim 2, wherein the inclination is between 20 degrees and 45 degrees.

4. The shingled magnetic recording system of claim 3, wherein the magnetic head has an asymmetrical shape in the track width direction.

5. The shingled magnetic recording system of claim 4, wherein the magnetic head has a side shield disposed only on an opposite side relative to a direction of overwriting of recording tracks on the magnetic recording medium.

6. The shingled magnetic recording system of claim 5, wherein the write pole comprises a main pole and wherein a side shield gap on a side of the direction of overwriting of the recording track is larger than a side shield gap on an opposite side.

7. The shingled magnetic recording system of claim 1, wherein the magnetic head has an asymmetrical shape in the track width direction.

8. A shingled magnetic recording system, comprising:
   a magnetic recording medium that includes a recording layer having a top surface and a bottom surface wherein a magnetization easy axis of the recording layer is oriented in a direction from the bottom surface to the top surface, and wherein the magnetization easy axis of the recording layer is inclined with respect to a recording track width direction; and
   a magnetic head including:
      a read head having a sensing element disposed between magnetoresistive shields; and
      a write head, wherein the write head includes:
         a write pole;
         non-magnetic material surrounding the write pole, wherein the non-magnetic material extends to a first edge of the write head in a cross track direction when viewed from an air bearing surface; and
         a side shield disposed adjacent the non-magnetic material, wherein the shield, when viewed from the air bearing surface, extends to a second edge of the write head in the cross track direction that is opposite the first edge.

9. The shingled magnetic recording system of claim 8, wherein the write pole has a throat height and a flare portion and wherein the throat height is substantially uniform from the ABS to the flare portion.

10. The shingled magnetic recording system of claim 8, wherein the side shield is spaced from the write pole by a distance of between about 10 nm and about 50 nm.

11. The shingled magnetic recording system of claim 8, wherein the side shield comprises nickel iron alloy or ferroalloy.

12. A shingled magnetic recording system, comprising:
   a magnetic recording medium that includes a recording layer having a top surface and a bottom surface wherein a magnetization easy axis of the recording layer is oriented in a direction from the bottom surface to the top surface, and wherein the magnetization easy axis of the recording layer is inclined with respect to a recording track width direction; and
   a magnetic head including:
      a read head having a sensing element disposed between magnetoresistive shields; and
      a write head, wherein the write head includes:
         a write pole;
         insulating material surrounding the write pole;
         a first shield disposed adjacent the insulating material, wherein the first shield, when viewed from an air bearing surface of the magnetic head, extends to a first edge of the write head in the cross track direction, and wherein the first shield is spaced a first distance from the write pole; and a second shield disposed adjacent the insulating material, wherein the second shield, when viewed from the air bearing surface, extends to a second edge of the write head opposite the first edge in the cross track direction, and wherein the second shield is spaced from the write pole by a second distance that is greater than the first distance.

13. The shingled magnetic recording system of claim 12, wherein the write pole has a throat height and a flare portion and wherein the throat height is substantially uniform from the ABS to the flare portion.

14. The shingled magnetic recording system of claim 12, wherein the first side shield is spaced from the write pole by a distance of between about 10 nm and about 50 nm.

15. The shingled magnetic recording system of claim 12, wherein the second side shield is spaced from the write pole by a distance of between about 20 nm and about 75 nm.

16. A shingled magnetic recording system, comprising:
   a magnetic recording medium that includes a recording layer having a top surface and a bottom surface wherein a magnetization easy axis of the recording layer is oriented in a direction from the bottom surface to the top surface, and wherein the magnetization easy axis of the recording layer is inclined with respect to a recording track width direction; and
   a magnetic head including:
      a read head having a sensing element disposed between magnetoresistive shields; and
      a write head, wherein the write head includes:
         a write pole;
         insulating material surrounding the write pole;
         a first shield disposed adjacent the insulating material, wherein the first shield, when viewed from an air bearing surface of the magnetic head, extends to a first edge of the write head in the cross track direction, and wherein the write pole has a first throat height adjacent the first shield; and
         a second shield disposed adjacent the insulating material, wherein the second shield, when viewed from the air bearing surface, extends to a second edge of the write head opposite the first edge in the cross track direction, wherein the write pole has a second throat height adjacent the second shield, and wherein the second throat height is greater than the first throat height.

17. The shingled magnetic recording system of claim 16, wherein the first side shield and the second side shield are spaced from the write pole by a substantially equal distance.

18. The shingled magnetic recording system of claim 16, wherein the side shield comprises nickel iron alloy or ferroalloy.

19. The shingled magnetic recording system of claim 1, wherein the magnetic head is coupled to a slider that is coupled to a suspension arm and wherein the slider is coupled to an actuator that positions the magnetic head over the magnetic recording medium.

20. The shingled magnetic recording system of claim 1, wherein the magnetic recording system is a shingled magnetic recording system.

* * * * *